United States Patent
Erikstrup

(10) Patent No.: US 8,663,863 B2
(45) Date of Patent: Mar. 4, 2014

(54) INTERCONNECT FOR A FUEL CELL, A METHOD FOR MANUFACTURING AN INTERCONNECT FOR A FUEL CELL

(75) Inventor: Niels Erikstrup, Frederiksberg C (DK)

(73) Assignee: Topsoe Fuel Cell A/S, Lyngby (DK)

( * ) Notice: Subject to any disclaimer, the term of this patent is extended or adjusted under 35 U.S.C. 154(b) by 444 days.

(21) Appl. No.: 13/056,803

(22) PCT Filed: Jun. 19, 2009

(86) PCT No.: PCT/EP2009/004433
§ 371 (c)(1),
(2), (4) Date: Jan. 31, 2011

(87) PCT Pub. No.: WO2010/012336
PCT Pub. Date: Feb. 4, 2010

(65) Prior Publication Data
US 2011/0129756 A1    Jun. 2, 2011

(30) Foreign Application Priority Data

Aug. 1, 2008  (DK) .......................... PA 2008 01059

(51) Int. Cl.
*H01M 2/38* (2006.01)
*H01M 8/00* (2006.01)
*B21D 31/00* (2006.01)

(52) U.S. Cl.
USPC .......................... 429/457; 429/535; 72/379.2

(58) Field of Classification Search
USPC .................................. 429/457, 535; 72/379.2
See application file for complete search history.

(56) References Cited

U.S. PATENT DOCUMENTS

2005/0142423 A1* 6/2005 Homma et al. ................. 429/38

FOREIGN PATENT DOCUMENTS

| CN | 1898825 A | 1/2007 |
|---|---|---|
| CN | 101101993 A | 1/2008 |
| EP | 1 300 902 A2 | 4/2003 |
| JP | 2006-127947 A | 5/2006 |
| WO | WO 98/10477 A1 | 3/1998 |

* cited by examiner

*Primary Examiner* — Karie Apicella
(74) *Attorney, Agent, or Firm* — Dickstein Shapiro LLP

(57) ABSTRACT

An interconnect for a fuel cell is made of pressed metal sheet. The interconnect integrates inlets and outlets, flow distributing inlet and outlet-zones seal surfaces and flow paths on both sides of the interconnect all formed and defined by discrete point or oblong protrusions made by the deformation of the sheet. A protrusion on one side of the interconnect corresponds to an indentation on the other side, but since the interconnect consists of three levels, the first side of the interconnect can be designed substantially independently of the second side.

17 Claims, 6 Drawing Sheets

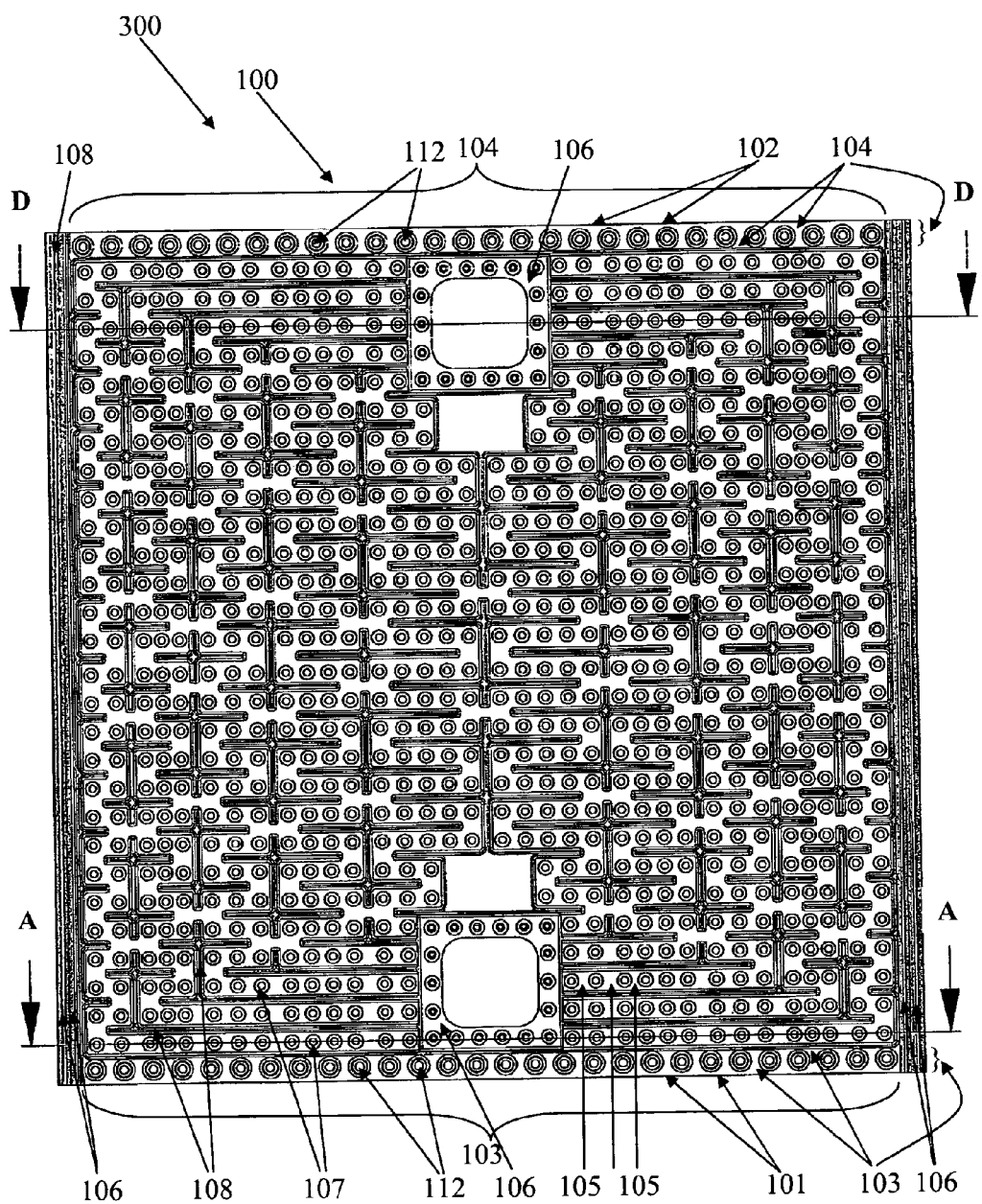
Figure 1-O

Figure 1-A
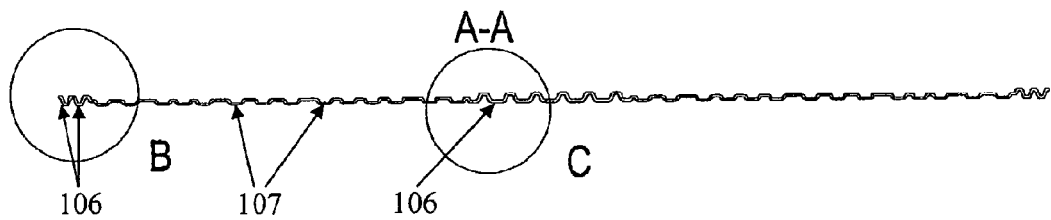
Figure 1-B
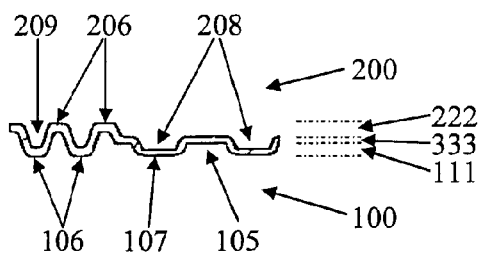
Figure 1-C
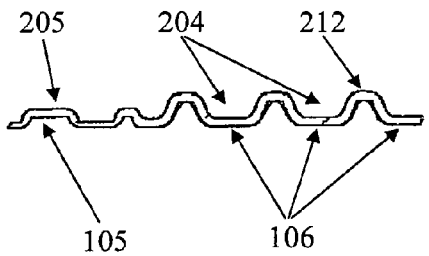
Figure 1-D
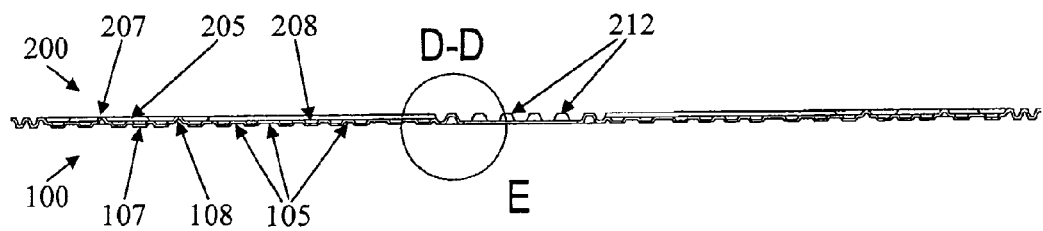
Figure 1-E
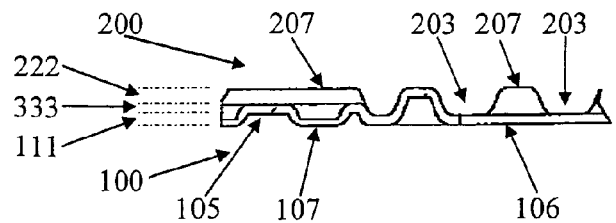

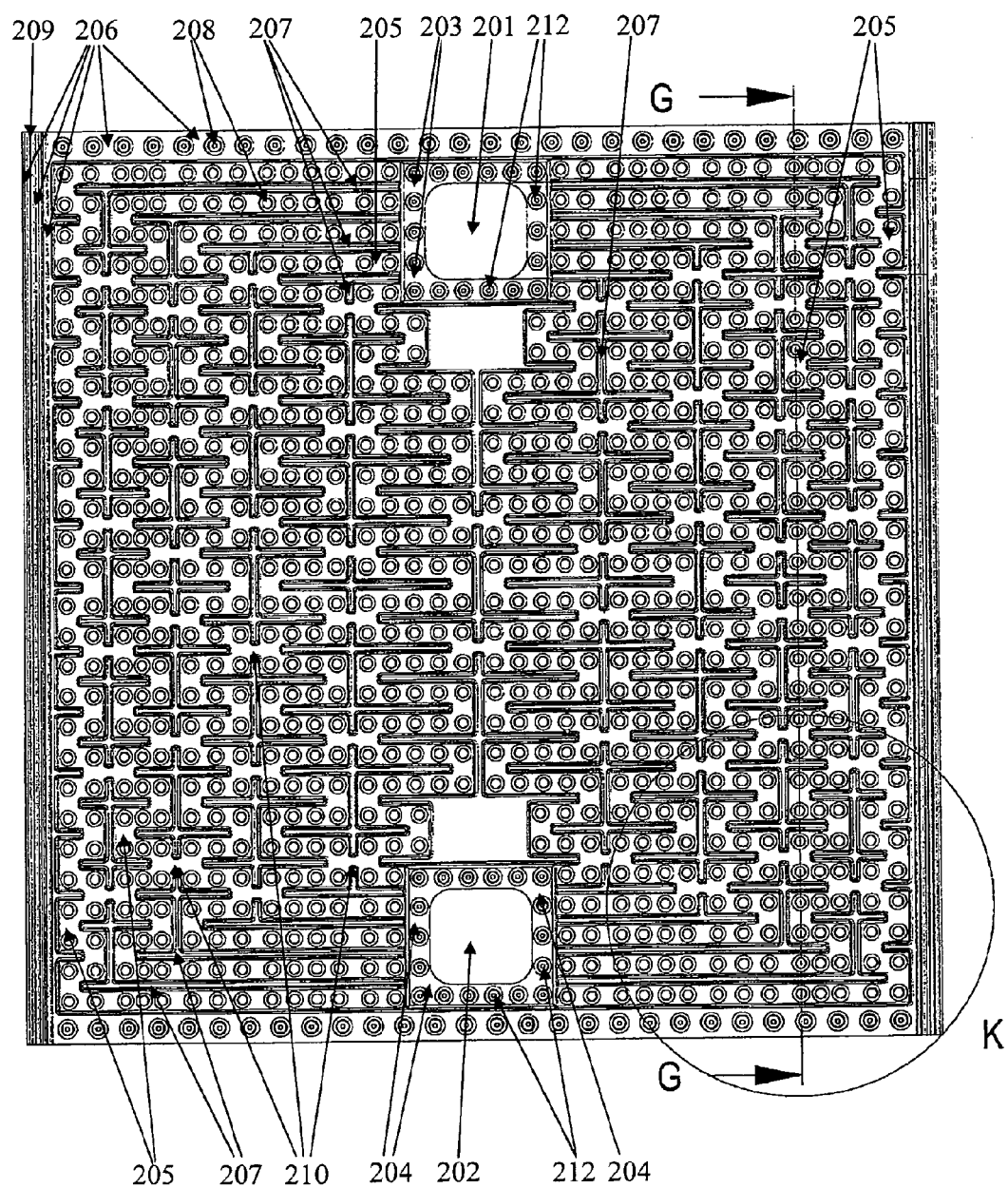
Figure 2-O

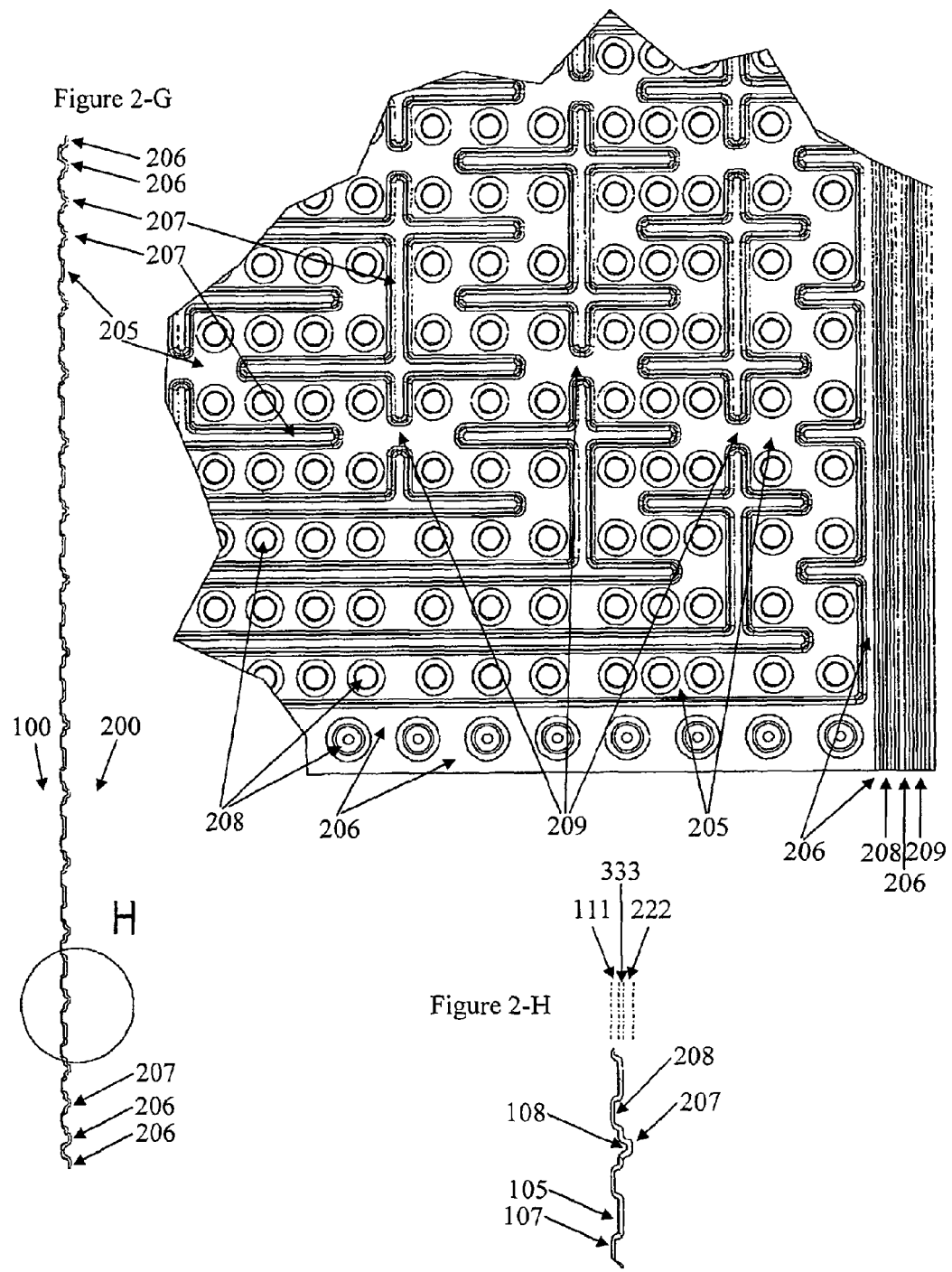

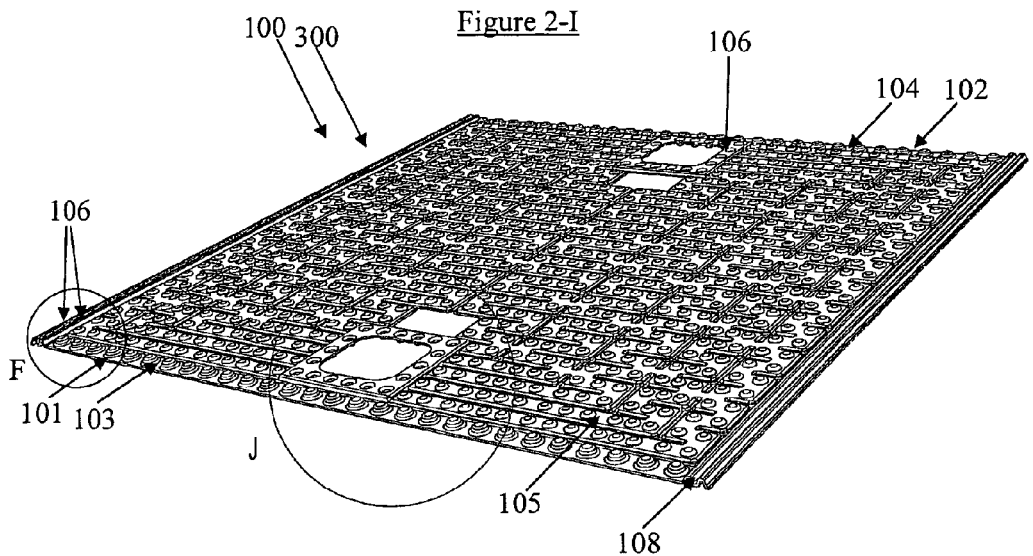
Figure 2-I
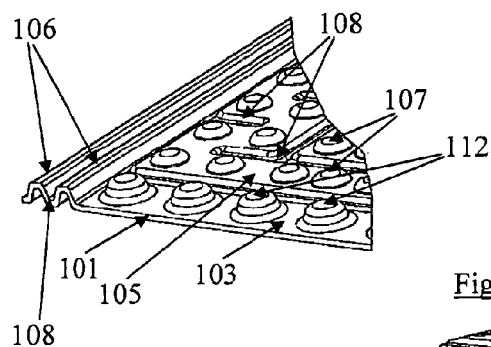
Figure 2-F
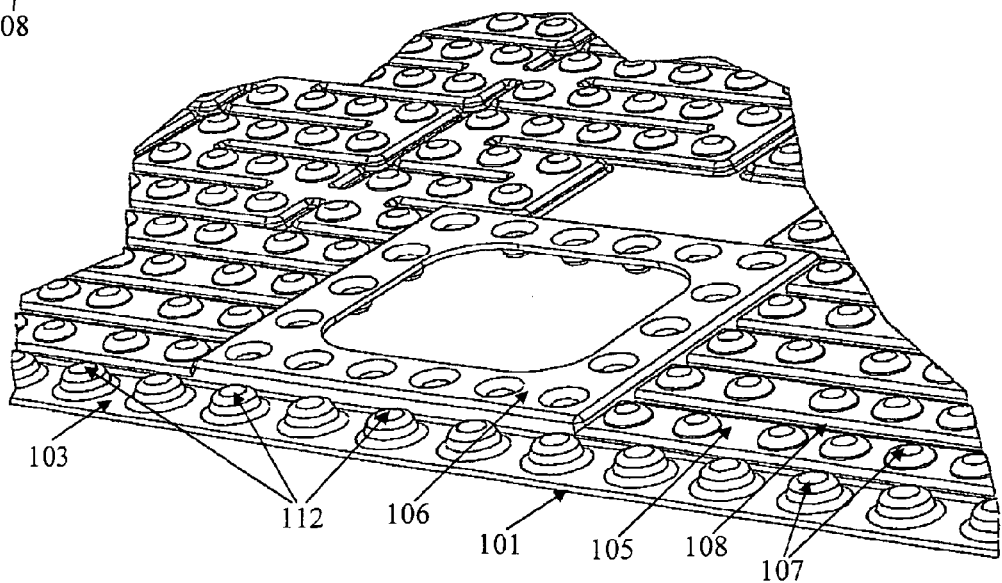
Figure 2-J

Figure 3-O
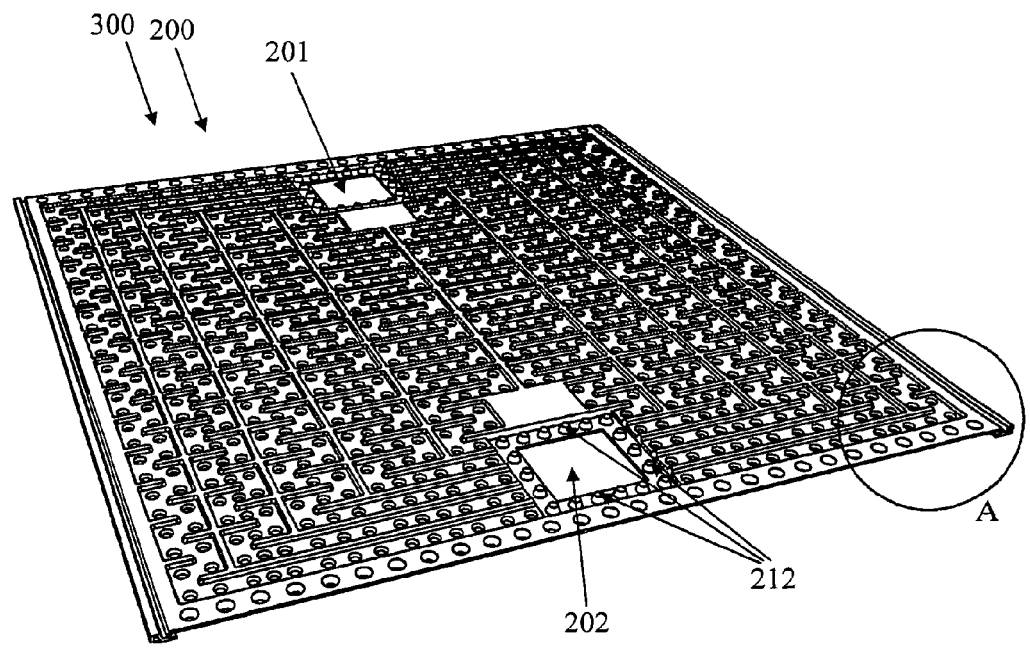
Figure 3-A
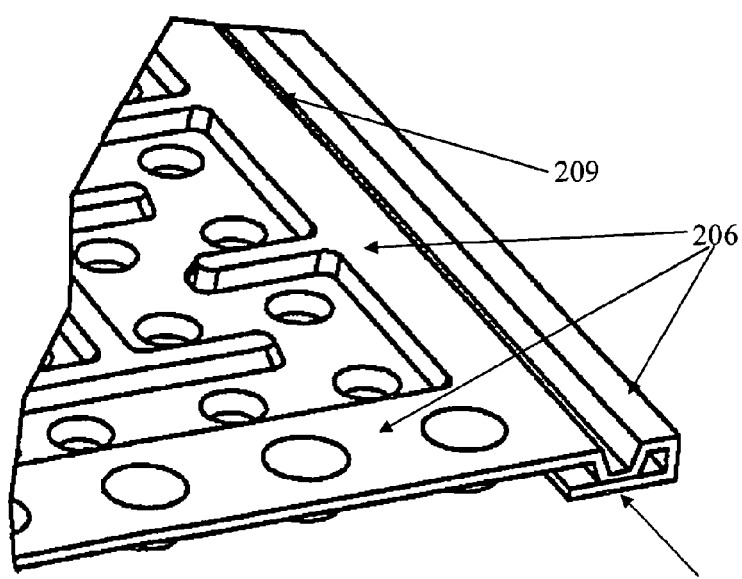

INTERCONNECT FOR A FUEL CELL, A METHOD FOR MANUFACTURING AN INTERCONNECT FOR A FUEL CELL

The invention relates to an interconnect for a fuel cell produced by plastic deformation of a thin metal sheet, thereby integrating protrusions and indentations for flow paths, inlet and outlet zones, seal surfaces and purge channels in a single piece of sheet.

In the following the invention will be explained in relation to a Solid Oxide Fuel Cell. The interconnect according to the invention can, however, also be used for other types of fuel cells such as Polymer Electrolyte Fuel cells (PEM) or a Direct Methanol Fuel Cell (DMFC). A Solid Oxide Fuel Cell (SOFC) comprises a solid electrolyte that enables the conduction of oxygen ions, a cathode where oxygen is reduced to oxygen ions and an anode where hydrogen is oxidised. The overall reaction in a SOFC is that hydrogen and oxygen electrochemically react to produce electricity, heat and water. In order to produce the required hydrogen, the anode normally possesses catalytic activity for the steam reforming of hydrocarbons, particularly natural gas, whereby hydrogen, carbon dioxide and carbon monoxide are generated. Steam reforming of methane, the main component of natural gas, can be described by the following equations:

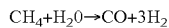
$CH_4 + H_2O \rightarrow CO + 3H_2$

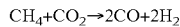
$CH_4 + CO_2 \rightarrow 2CO + 2H_2$

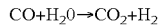
$CO + H_2O \rightarrow CO_2 + H_2$

During operation an oxidant such as air is supplied to the solid oxide fuel cell in the cathode region. Fuel such as hydrogen is supplied in the anode region of the fuel cell. Alternatively, a hydrocarbon fuel such as methane is supplied in the anode region, where it is converted to hydrogen and carbon oxides by the above reactions. Hydrogen passes through the porous anode and reacts at the anode/electrolyte interface with oxygen ions generated on the cathode side that have diffused through the electrolyte. Oxygen ions are created in the cathode side with an input of electrons from the external electrical circuit of the cell.

To increase voltage, several cell units are assembled to form a stack and are linked together by interconnects. Interconnects serve as a gas barrier to separate the anode (fuel) and cathode (air/oxygen) sides of adjacent cell units, and at the same time they enable current conduction between the adjacent cells, i.e. between an anode of one cell with a surplus of electrons and a cathode of a neighbouring cell needing electrons for the reduction process. Further, interconnects are normally provided with a plurality of flow paths for the passage of fuel gas on one side of the interconnect and oxidant gas on the opposite side. To optimize the performance of a SOFC stack, a range of positive values should be maximized without unacceptable consequence on another range of related negative values which should be minimized. Some of these values are:

| VALUES TO BE MAXIMIZED | VALUES TO BE MINIMIZED |
| --- | --- |
| Fuel utilization | Price |
| electrical efficiency | Dimensions |
| life time | (temperature, to a point) |
| | production time |
| | fail rate |
| | number of components |

| VALUES TO BE MAXIMIZED | VALUES TO BE MINIMIZED |
| --- | --- |
| | Parasitic loss (heating, cooling, blowers . . .) |

The interconnect has direct influence on a plurality of the mentioned values. Almost all the values are interrelated, which means that altering one value will impact other values. Some relations between the characteristics of the interconnect and the above values are mentioned here:

Fuel Utilization:

The flow paths on the fuel side of the interconnect should be designed to seek an equal amount of fuel to each cell in a stack, i.e. there should be no flow- "short-cuts" through the fuel side of the stack.

Parasitic Loss:

Design of the flow paths on the interconnect should seek to achieve a low pressure loss per flow volume at least on the air side and potentially on the fuel side of the interconnect, which will reduce the parasitic loss to blowers.

Electric Efficiency:

The interconnect leads current between the anode and the cathode layer of neighbouring cells. Hence, to reduce internal resistance, the electrically conducting contact points (hereafter merely called "contact points") of the interconnect should be designed to establish good electrically contact to the electrodes (anode and cathode) and the contact points should no where be far apart, which would force the current to run through a longer distance of the electrode with resulting higher internal resistance.

Lifetime:

Depends in relation to the interconnect, on even flow distribution on both fuel and air-side of the interconnect, few components and even protective coating on the materials among others.

Price:

The interconnects price contribution can be reduced by not using noble materials, by reducing the production time of the interconnect and minimizing the material loss.

Dimensions:

The overall dimensions of a fuel stack is reduced, when the interconnect design ensures a high utilization of the active cell area. Dead-areas with low fuel or air flow should be reduced and inactive zones for sealing surfaces should be minimized.

Temperature:

The temperature should be high enough to ensure catalytic reaction in the cell, yet low enough to avoid accelerated degradation of the cell components. The interconnect should therefore contribute to an even temperature distribution giving a high average temperature without exceeding the maximum temperature.

Production Time.

Production time of the interconnect itself should be minimized and the interconnect design should also contribute to a fast assembling of the entire stack. In general, for every component the interconnect design renders unnecessary, there is a gain in production time.

Fail Rate.

The interconnect production methods and materials should permit a low interconnect fail rate (such as unwanted holes in the interconnect gas barrier, uneven material thickness or characteristics). Further the fail-rate of the assembled cell stack can be reduced when the interconnect design reduces the total number of components to be assembled and reduces the length of seal surfaces.

Number of Components.

Apart from minimizing errors and assembling time as already mentioned, a reduction of the number of components leads to a reduced price.

US 20040219423 describes an internal manifolding interconnect made from for instance a stainless steel metal sheet with a thickness of 0.1-2 mm. The sheet can be stamped to provide raised ridges and/or dimples defining the flow paths on both sides of the interconnect.

U.S. Pat. No. 7,318,973 discusses problems concerning sealing of the cell stack layers. An internally manifolding interconnect is disclosed, which is made of stamped metal sheet with two surfaces each having flow fields thereon. The flow paths are defined by separate stamped bridge members assembled with the interconnect plate.

In US 20030124405 the flow fields on opposites sides of the stamped bipolar plate made from metal sheet are defined when further including a staggered seal arrangement to direct the flow.

Seeking to reduce the component numbers, the interconnect of U.S. Pat. No. 5,424,144 integrates the seal region in the single piece pressed metal plate by incorporating an insert ring to form an insert ring seal as well as a peripheral wet seal. Though called a one piece separator plate, the interconnect of U.S. Pat. No. 5,424,144 still needs a plurality of metal insert rings to transfer the compressive force to the seal.

Further metal sheet interconnects are described in U.S. Pat. No. 6,699,614, WO 2005112165, EP 1284512, U.S. Pat. No. 7,186,476 and US 20080026279.

It is an object of the invention to provide an interconnect for a fuel cell stack which increases fuel utilization by having an even retention time of the fuel in the cell regardless of which flow path the fuel passes through.

It is an object of the invention to provide an interconnect with low pressure loss which reduces the parasitic loss.

It is a further object of the invention to provide an interconnect with a design of contact points that contributes to a high electrical efficiency of a fuel cell stack.

It is yet a further object of the invention to provide an interconnect with a design that optimizes the flow distribution and average temperature over the cell area while not exceeding the maximum temperature.

An object of the invention is further to reduce the price, dimensions, the production time and fail rate of the interconnect and the cell stack.

It is another object of the invention to provide an interconnect which reduces the number of components in a fuel cell stack and the sealing numbers and surface areas.

It is a further object of the invention to provide an interconnect for fuel cell stack without emission of unburned fuel through the outer surfaces of the stack.

These and other objects are achieved by the invention as described below.

Accordingly, an interconnect is provided for especially solid oxide fuel cells, but also potentially to other fuel cells such as PEM and DMFC. In any case, the fuel cell comprises a plurality of flow providing manifolds, which can be of the internal manifolding type, the external manifolding type or a mixture of both. The interconnect is made of metal sheet and comprises a first oxidant side and opposite the oxidant side a second fuel side. The first oxidant side contains a plurality of oxidant gas flow paths and the fuel side contains a plurality of fuel gas flow paths. It would be understood that the oxidant side and fuel side of the interconnect correspond, respectively, to two neighbouring cells cathode and anode side. Thus, a first side (face) of the interconnect defines the oxidant side and the opposite side (face) defines the fuel side. The oxidant and fuel gas flow paths are open at both ends and have one or more flow inlets and flow outlets which can be in the form of aperture(s) in the interconnect in case of internal manifolding or formed on a part of the edge of the interconnect in case of external manifolding. In the following, embodiments will be disclosed which have external manifolding on the first oxidant side and internal manifolding on the second fuel side as a compromise between maximizing the effective area of the cell and having well defined sealing on the second fuel side of the interconnect. Adjacent to the flow inlets, the interconnect comprises inlet zones which have the purpose of distributing the flow from the inlet evenly to the plurality of flow paths. Where the inlet is an aperture, the inlet zone extends from the periphery of the inlet and a distance away from the aperture around the whole or a part of the inlet. The distance which defines the width of the inlet zone can be unchanged over the whole extent of the inlet zone around or partly around the inlet or the width can vary. When using external manifolding, the inlet zone is defined as the zone from the edge of the inlet extending over a part of the interconnect and a distance into the interconnect surface. In both cases the distance can vary. To lead the flow on both sides of the interconnect from the flow paths to the outlets, the interconnect further comprises one or more flow outlet zone(s) on each side of the interconnect. The outlet zones can be designed similar to the inlet zone or a more simple design can be chosen. The interconnect further comprises protruding seal surfaces which ensures a well defined surface for a gasket or sealing to contact and seal to, when sealing an interconnect to a neighbouring electrode, anode or cathode. Preferably, the seal surfaces have an even thickness (protrusion height) throughout the interconnect area as well as material characteristics such as heat expansion not varying from the rest of the interconnect. To ensure electrical efficiency and minimized internal electrical resistance in the electrolyte, electrodes and interconnect itself, the interconnect also has an array of protruding electrically conducting contact points over the whole interconnect area. A balance is sought to have as many contact points with as little internal distance as possible and at the same time use as little area of the interconnect for contact points as possible, so the most area is used for flow paths, that is, can be active. It is also important that the contact points have good electrically contact to the neighbouring electrode, thus the contact should be held against the neighbouring electrode with a minimum of force.

As the interconnect according to the present invention is made of metal sheet, the protrusions can be made by shaping the metal sheet by any known process such as stamping, pressing, milling, deep drawing or the like. At least three levels of the interconnect are then defined: a mid-level is defined by the metal sheet before any deformation is performed; the first level is defined as the level from the surface of the un-deformed first side of the metal sheet interconnect to the top of the protrusions on the first side of the interconnect; and the second level is defined as the level from the surface of the un-deformed second side of the interconnect to the top of the protrusions on the second side of the interconnect. The flow paths on the first side are formed between the protrusions on the first side of the interconnect (the protruding contact points and the protruding seal surfaces) and the flow paths on the second side of the interconnect are formed between the protrusions on the second side (contact points and seal surfaces).

Therefore, the concept of having at least three levels allows for designing the flow paths on the first side independent of the flow paths on the second side, which is a great advantage in any case, but especially when combining external manifolding on one side and internal manifolding of the other side as this calls for asymmetrical flow paths. Off course a protrusion on the first side corresponds an indentation on the second side of the interconnect and vice versa, and this is also in the present invention utilized to form small recirculation zones. Positively defining the flow paths are the protrusions, as these have to be circumvented by the flow, hence, a mid level forming a barrier surface and two separate independent protrusion levels allows for substantially independent flow path design on each side of the interconnect, i.e. on the first oxidant side and the second fuel side. It follows from the process of plastically deforming a metal sheet to produce the described three-level interconnect plate that any protrusion on the first side and therefore in the first defined level corresponds an indentation on the second side of the interconnect but also in the first level. Likewise, a protrusion on the second side of the interconnect, hence in the second defined level corresponds an indentation on the first side but the indentation being located in the second level. This at least three-level interconnect design does not only allow for independent first- and second side flow path design, but also very important allows the integration of all flow inlet zones, flow outlet zones, all flow paths, contact areas and seal surfaces on both sides of the interconnect into one single piece of metal sheet. No extra rings or special pattern seals are needed to form the whole interconnect. This substantially reduces the production price and assembling price and time as well as lowers the risk of errors due to mal-assembly or leaking seals.

A further advantage of the described single metal sheet design with integrated seal surfaces and contact points is that the even material thickness and non-rigid geometry of the whole interconnect will transfer less potentially damaging mechanical stress to the neighbouring cells and sealing areas than will a more rigid, non-flexible interconnect with varying cross sectional material thickness.

In a further embodiment of the invention, the seal surface, especially on the second fuel side of the interconnect comprise at least one purge channel, within which oxidant flows and into which in the event of a leakage the leaking fuel gas is mixed. Said at least one purge channel is in the form of an elongated groove open at both ends that at least extends along one perimeter edge of the second fuel side of the interconnect, and in which said at least one purge channel has an inlet side for the passage of oxidant gas from the oxidant gas inlet manifold at one open end and an outlet side for the passage of gas to the outlet oxidant gas manifold at the other open end. When the sealing surface of the interconnect is made by elongate protrusions for example in the shape of S-bends, the purge channel can be formed as one of the elongate grooves on the second fuel side of the S-shape as exemplified in the following drawings.

The total thickness of the interconnect is defined as the metal sheet material thickness plus the height of the protrusions on the first side in the first level plus the height of the protrusions on the second side in the second level of the interconnect. As the sheet material is thin, it follows that the protrusions, either in the shape of discrete points or oblong ridges, are flexible. This has the advantage that small discrepancies in the tolerances can be absorbed and to some extent the temperature expansions can be compensated. The metal sheet material thickness can be in a wide range depending on the context, preferably it is in the span from 50 to 1000 µm, preferably between 50 and 400 µm, preferably from 100 to 250 µm. The metal can be any suitable kind and of any suitable alloy, such as chrome steel, ferritic stainless steel, austenitic stainless steel, nickel based alloys, nickel, a range of noble metals and oxide dispersion strengthened alloys.

As explained, it is important for the effectiveness and lifetime of the fuel cell that the interconnect provides an even flow distribution over as large an area of the interconnect as possible. Therefore in an embodiment of the invention, the flow paths on the first side and second side of said interconnect are designed to provide even flow distribution between each of the flow paths on the first side and the second side, respectively. Ideally all conditions such as pressure-loss, flow and flow-path design should be equal throughout the interconnect area to achieve an even flow distribution. If this is not possible, an even flow-distribution can be strived towards, by designing the flow paths with even pressure-loss, even cross-sectional area, even length or a mixture of all. Depending on the circumstances, the flow on the first side relative to the flow on the second side can be co-current or counter-current; further the flow on either side can be substantially linear from the inlet side to the outlet side, or the flow can be substantially serpentine with a large part of the flow stream running in intersecting or counter-directions relatively to the inlet-to-outlet-direction.

The current invention with at least three layers allows for a flow-type on the first side, which is substantially independent of the flow-type on the second side: As an example, on the first side, the protrusions can positively force the first oxidant flow in a substantially linear flow from the inlet zone along the edge of the inlet side of the interconnect to the outlet zone along the edge of the outlet side of the interconnect (the meaning of substantially is here to be understood such that the main part of the flow runs in the linear inlet-to-outlet direction, whilst a relatively smaller part of the flow is directed in intersecting directions as a result of the deviations occurring when the flow stream passes the contact points and the intersecting indentations); and the same interconnect can on the second side have protrusions that forces the fuel flow in a substantially serpentine flow, where substantially all the fuel flow makes several turns in directions other than the main inlet-to-outlet flow-direction.

When forcing the flow in discrete flow-paths a possible error can occur if a flow-path gets blocked for some reason i.e. material faults, impurities, mal-assemblage etc. Even if the blockage is only in a small area of the interconnect, it can render a whole flow-path inactive with at least less efficiency as a result and possibly material faults and cell-stack fault. To counter the effects of a blockage, in an embodiment of the invention the flow paths are intersected by by-pass flow paths comprising breaches in the protruding contact areas. This ensures that only a smaller part of a flow-path will be blocked and inactive in case of a blockage, the flow will be allowed to run through nearby breaches, by-pass the blockage via neighbouring flow-paths and return to the original flow-path via breaches intersecting the flow-path after the blockage.

A further advantage of the at least three-layer design of the interconnect according to the present invention is that the protrusions can be designed to the conditions on each side of the interconnect independently. In the example where linear flow is desired on the first side of the interconnect and substantially serpentine flow is desired on the second side of the interconnect, advantageously the protruding contact points on the first side can comprise discrete points, whilst on the second side the protruding contact points can comprise oblong ridges or vice versa. A further embodiment of the invention comprises a process for manufacturing an interconnect according to the preceding description. A metal sheet is provided of the materials mentioned or any other metal suitable for plastic deformation. Then, protrusions for flow paths, flow inlets, flow inlet zones, flow outlets, flow outlet zones, seal surfaces and contact areas according to the preceding description are pressed in a first and a second layer of the metal sheet adjacent to the mid level of the metal sheet defined by the metal sheet prior to the pressing process. The pressing process plastically deforms the metal sheet such that the protrusions pressed into the two layers will remain after the pressing process is finished. The metal sheet may have apertures cut out in advance, or the apertures may be cut or stamped out at the same time as the pressing process is conducted. Likewise, the metal sheet may be provided having its final outer periphery dimensions or, like any apertures, the final dimensions may be cut or stamped out at the same time as the pressing process is conducted.

Alternatively, the pressing process may be conducted in more than one step, and any cutting or stamping of outer metal sheet edges or apertures may be conducted in steps before or after the pressing process occurs. In an embodiment of the invention a further process step of folding a part of the metal sheet can follow. The folding can be performed on one or a plurality of the edges of the metal sheet to form an oblong seal surface along the edge(s). This allows for seal surfaces having a relatively large width on both sides of the same section of the interconnect.

The metal sheet may prior to the manufacturing be coated with a protective layer to protect the interconnect from the operating conditions, or the interconnect may be coated after the manufacturing process. Hence, according to the invention, it is possible to manufacture a metal sheet interconnect with integrated seal surfaces, flow paths, inlets, inlet zones, outlets, outlet zones, contact points, by-passing breaches and by-passing indentations in a single manufacturing step, or in a simple small number of consecutive manufacturing steps.

Accordingly, when compared to state of the art interconnects, the main advantages of the invention are:
- Production price of the interconnect is reduced.
- Material price of the interconnect is reduced, the material waste is minimized and any cut away material can be recycled.
- Production time of the interconnect is reduced.
- Fuel cell stack assembling time is reduced.
- Fuel cell mal-function due to mal-assemblage is reduced.
- Active area relative to the total area of the interconnect and therefore the fuel cell is increased.
- Flow distribution is enhanced.
- Electrical efficiency is increased.
- Number of components is reduced.
- Leaks and faults due to uneven and non flexible heat expansion of the cell stack are reduced.
- Fuel utilization is increased.
- The life time of the interconnect and the cell stack is increased.
- Parasitic loss is reduced due to low pressure drop.
- Increased safety. Risk of leakage of unburned fuel and explosion is countered and therefore an expensive and bulky air diluting container outside the fuel cell stack is no longer needed.
- Less dependency on expensive gas-tight fuel seals along the edges of the interconnect.
- No need for a separate fan or blower for purge air. The purge air is provided by the process air blower adapted to the air manifold.
- Start-up time is reduced due to low mass and the flexible geometry that allows higher thermal gradients without harming cells or seals.

1. An interconnect for a fuel cell comprising a plurality of flow providing manifolds, the interconnect comprises a first and a second side, each side having flow paths, one or more flow inlets and inlet zones distributing the flow between said flow paths, one or more flow outlets and outlet zones, protruding seal surfaces, protruding contact areas and protruding seal surface supports, said flow paths are formed between the protruding seal surfaces and the protruding contact areas, wherein said interconnect is made of a metal sheet comprising at least a mid level defined by the metal sheet part without protrusions, a first level defined by the protrusions on the first side and a second level defined by the protrusions on the second side such that a protrusion on the first side corresponds an indentation on the second side extending into the first level and a protrusion on the second side corresponds an indentation on the first side extending into the second level; and the flow inlet zones, the flow outlet zones, the flow paths, the contact areas, the seal surface supports and the seal surfaces are integrated in both sides of said metal sheet.

2. An interconnect according to feature 1, wherein the position of said seal surfaces are supported by indentations.

3. An interconnect according to any of the preceding features, wherein one or more of said seal surfaces on the first or second side comprise(s) at least one purge channel.

4. An interconnect according to any of the preceding features, wherein said seal surfaces and said electrically conducting contact areas are flexible.

5. An interconnect according to any of the preceding features, wherein said metal sheet has a thickness between 50 and 400 μm, preferably between 100 and 250 μm.

6. An interconnect according to any of the preceding features, wherein said metal sheet consist of chrome steel or a nickel alloy.

7. An interconnect according to any of the preceding features, wherein said flow paths on the first side and second side of said interconnect are designed to provide even flow distribution between each of the flow paths on the first side and the second side, respectively.

8. An interconnect according to any of the preceding features, wherein the one or more flow inlets on the first or second side of said interconnect is internal and the one or more flow inlets on the second or first side, respectively, of said interconnect is external.

9. An interconnect according to any of the preceding features, wherein the flow paths on the first or second side of said interconnect is arranged to provide serpentine flow and the flow paths on the second or first side, respectively, of said interconnect are arranged to provide co- or counter-current flow relative to the main direction of the serpentine flow.

10. An interconnect according to any of the preceding features, wherein said flow paths are intersected by by-pass flow paths comprising breaches in the protruding contact areas.

11. An interconnect according to any of the preceding features, wherein said flow paths are intersected by indentations.

12. An interconnect according to any of the preceding features, wherein the protruding contact areas on the first or second side of said interconnect comprise discrete points and the protruding contact areas on the second or first side respectively comprise oblong ridges.

13. A fuel cell repeating unit comprising an electrolyte, an anode, a cathode and an interconnect according to anyone of features 1 to 12.

14. A fuel cell repeating unit according to feature 13, wherein the fuel cell is a high temperature fuel cell.

15. A fuel cell repeating unit according to feature 13, wherein the fuel cell is a solid oxide fuel cell or a molten carbonate fuel cell.

16. A fuel cell repeating unit according to feature 13, wherein the fuel cell is a PEM proton exchange membrane fuel cell.

17. A fuel cell repeating unit according to feature 13, wherein the fuel cell is a DMFC direct methanol fuel cell.

18. A fuel cell stack comprising at least two fuel cell repeating units according to features 12-17.

19. Process for manufacturing an interconnect according to any of the features 1-11 comprising the steps of
   providing a metal sheet to a press
   pressing protrusions in the metal sheet, thereby forming flow paths, one or more flow inlets and inlet zones distributing the flow between said flow paths, one or more flow outlets and outlet zones, seal surfaces and contact areas.

20. Process for manufacturing an interconnect according to feature 19 further comprising the step of
   folding a part of the interconnect to form seal surfaces.

The invention is further illustrated by the accompanying drawings showing examples of embodiments of the invention.

FIG. 1-O shows the first side of an interconnect according to an embodiment of the invention.

FIG. 1-A shows a cut along the line A-A of the interconnect shown on FIG. 1-O. The first side of the interconnect facing downwards.

FIG. 1-B shows details of the seal surfaces along one edge of the interconnect and the purge channel of FIG. 1-A.

FIG. 1-C shows details of the seal surface on the first side on the interconnect opposing the outlet on the second side.

FIG. 1-D shows a cut along the line D-D of the interconnect shown on FIG. 1-O. The first side of the interconnect facing downwards.

FIG. 1-E shows details of the seal surface on the first side of the interconnect opposing the inlet on the second side.

FIG. 2-O shows the second side of an interconnect according to an embodiment of the invention.

FIG. 2-G shows a cut along the line G-G of the interconnect shown on FIG. 2-O. The first side of the interconnect facing left.

FIG. 2-K shows a blow-up of the lower right corner section of the interconnect shown on FIG. 2-O.

FIG. 2-H shows a blow-up of a section of the cut shown on FIG. 2-G.

FIG. 2-I shows a perspective view of first side of the interconnect.

FIG. 2-F shows in perspective details of lower left corner of the interconnect shown on FIG. 2-I including two purge channels on the second side.

FIG. 2-J shows in perspective details of the seal surface on the first side of the interconnect opposing the outlet on the second side.

FIG. 3-O is a perspective view of the second side of the interconnect in an embodiment with two folded edges of the interconnect forming broad seal surfaces on both sides.

FIG. 3-A shows in perspective the details of the folded seal surface edges shown on FIG. 3-O.

POSITION NUMBER OVERVIEW

300. Interconnect
333. Mid level
100. First side
101. First side flow inlet
102. First side flow outlet
103. First side flow inlet zone
104. First side flow outlet zone
105. First side flow path
106. First side protruding seal surface
107. First side protruding contact area
108. First side indentations
111. First level
112. First side protruding seal surface supports
200. Second side
201. Second side flow inlet
202. Second side flow outlet
203. Second side flow inlet zone
204. Second side flow outlet zone
205. Second side flow path
206. Second side protruding seal surface
207. Second side protruding contact area
208. Second side indentations
209. Second side purge channel
210. Second side by-pass flow paths
212. Second side protruding seal surface supports
222. Second level FIG. 1-O shows the first side 100 of the interconnect 300 in the form of a rectangular plate defining four interconnect perimeter edges. The interconnect has a first side 100 on one face of the interconnect shown here, which in this example is the oxidant side of the interconnect, and a second side 200 on the opposite face shown on FIG. 2, which in this example is the fuel side of the interconnect. Oxidant gas such as air from inlet oxidant manifold (not shown) is introduced to the first side oxidant flow inlet 101, which stretches along a relatively large part of one perimeter edge of the interconnect. This type of inlet is characteristic for external manifolding, which leads the flow to the inlet via an external manifold (not shown) sealed to the outer surface of the assembled fuel cell stack comprising a number of fuel cells including interconnects according to the invention.

Through the first side flow inlet the oxidant enters the first side flow inlet zone 103, which is the area delimited by the first side protruding seal surfaces 106, the first side flow inlet and a relatively small distance into the interconnect area, in this example approximately 2-8 millimeters. The first side flow inlet zone comprises a number of first side protruding seal surface supports 112, which serves to ensure electrical conducting and mechanical contact between the interconnect and the adjacent electrode (cathode) (not shown), to support the seal surface (206) on the opposite side of the interconnect and further serves to distribute the oxidant flow evenly from the inlet among the first side flow paths 105. The first side flow paths are open at both ends and runs over the major part of the area of the first side of the interconnect from the first side inlet zone at one end of the flow paths to the first side outlet zone 104 at the other end of the flow paths. The first side flow paths are bordered along two edges of the interconnect by the protruding seal surfaces 106. The first side protruding contact areas 107, arranged in a line pattern defines the first side flow paths, which runs in-between the lines of protruding contact areas here in the form of discrete points. The oxidant flow follows the first side flow paths in a substantially linear flow from the first side flow inlet zone to the first side flow outlet zone, yet a part of the oxidant flows in between the protruding points in diverging directions (staggered) led by the diversions introduced by the protruding points and also by the first side indentations 108 which intersects the first side flow paths. The first side indentations corresponds protrusions on the opposite side of the interconnect but in this way also serves a purpose on the first side of the interconnect.

It will be understood that the first side flow paths are further defined by the first side of the interconnect plate, the two first side protruding seal surfaces surrounding the second side fuel flow inlet 201 and outlet 202 and the adjacent electrode surface (not shown) contacting a top part of the first side protruding contact areas and seal surfaces (incl. gaskets—not shown). The first side outlet zone is designed analogue to the first side inlet zone.

On FIG. 1-A a sectional view of the interconnect is also shown: The total thickness of the interconnect is defined as the distance from the maximum protrusion height on the first side to the maximum protrusion height on the second side. In the present view, the maximum height of the protruding seal surfaces on either side is equal to the maximum height of the protruding contact areas yet according to the circumstances and wished characteristics, it is to be understood that any protrusion height can be designed independently from the others, i.e. protruding seal surfaces can be higher than protruding contact points and vice versa, and the maximum protrusion height on the first can be larger or smaller than the maximum protrusion height on the second side, which can influence the flow and the pressure loss on either side. The described heights can be more clearly seen on the following blow-up sections.

FIG. 1-B is a blow-up of the sectional view including the protruding seal surfaces along the edge of the interconnect. According to the present invention, three interconnect levels are defined which are apparent on FIG. 1-B. According to the present invention, the protrusions and corresponding indentations are made by plastically deforming, for instance pressing a plate of metal sheet. Hence, a mid level 333 of the interconnect is defined by the un-deformed metal sheet and on the sectional view of FIG. 1-B can be seen as stretching from one face to the other of the un-deformed metal sheet, thus having a dimension equal to the material thickness of the un-deformed metal sheet. Further a first level 111 of the interconnect is defined as a level above the first side of the interconnect reaching from the surface of the first side of the un-deformed metal sheet to the maximum height of the first side protrusions. On FIG. 1-B the maximum height of the first side protrusions are represented by the top of the first side protruding seal surface (facing down) and the maximum height of the second side protrusions are represented by the top of the second side protruding seal surface 206 (facing up). The major part of the interconnect sheet adjacent to the seal surface on FIG. 1-B is located in the mid level except for the discrete point first side protrusions located in the first level.

FIG. 1-C shows a blow-up of the sectional view of the second side flow outlet 202 and second side flow outlet zone 204—in case of substantially counter-current flow of the oxidant relative to the fuel. In case of co-current flow, FIG. 1-C shows a part of the second side flow inlet 201 and second side flow inlet zone 203. In FIG. 1-C as in FIG. 1B, it can be seen that the maximum height of the protrusions are represented by the first side seal surface around the second side flow outlet. Said seal surface has a pattern of discrete point indentations reaching from the first level through the mid level and into the second level, thereby defining contact areas 207 on the second side of the interconnect and flow distributing points in the second side outlet zone.

FIG. 1-D shows a sectional view of the interconnect in a section which intersects the second side flow inlet. Therefore, on FIG. 1-E which is a blow-up of the part of FIG. 1-D around the second side flow inlet, the terminated edge of the interconnect sheet serving as the edge of the second side inlet can be seen as a first side protruding seal surface located in the first level. In this embodiment of the invention, having the second side inlet/outlet and inlet/outlet zone entirely within the interconnect area, the second side is defined as having internal manifolding. Thus, according to this embodiment of the invention, the interconnect has external manifolding on the first side and internal manifolding on the second side.

FIG. 2-O shows the second side 200 of the interconnect, in this example the fuel side. As described in the foregoing, the fuel flow enters via the second side flow inlet 201 and is evenly distributed to the second side flow paths 205 by means of the second side flow inlet zone 203, in this embodiment located in a an area stretching from the edge of the second side inlet and distance of approximately 2-8 millimeters into the surface of the second side of the interconnect.

On FIG. 2-O, the inlet zone is open except for some second side protruding seal surface supports 212 towards two side directions leading to the plurality of flow paths, whereas the upper and lover directions are blocked by second side protruding seal surfaces 206. The supporting seal surface supports on both sides of the interconnect (112 and 212) serves to provide an even flow distribution on the side they are protruding into (flow distribution zone) and to provide support to the opposing seal surface on the other side. On the second side of the interconnect, the flow paths which distributes the flow of fuel evenly over the active area of the adjacent electrode (anode)(not shown) facing the second side of the interconnect are defined by second side oblong protruding contact areas as well as the second side protruding seal surfaces. Side walls to the flow paths are formed by the oblong contact areas, which divides the area of the second side of the interconnect into separate paths it was not for the second side by-pass flow paths 210. After the first part of the flow path has lead the flow in a direction substantially perpendicular to the main second side inlet-to-outlet flow direction, the by-pass flow paths allows each of the sub-flows in each flow path to contact the neighbouring sub-flows. This allows a sub-flow to divert a potential blockage of a flow path and return to the flow path after the blockage, thus minimizing the effect of such a blockage. When ignoring the by-bass flow paths, it can be seen on FIG. 2-O that all the fluid flow paths are of substantially the same length and have a substantially equal cross sectional area. This is one way of seeking to ensure an even flow distribution between the flow paths and thus over the total active area of the interconnect and the adjacent electrode. It can be understood that the design can promote the even flow distribution in other ways not shown, for instance shorter flow paths could be made more narrow thus increasing the pressure loss per length of flow path. The protrusions, discrete and especially the oblong formed, also provide a stabilizing profile of the sheet interconnect. It can be seen on the figure that all four edges of the second side of the interconnect are sealed by second side protruding seal surfaces (and gaskets—not shown) thus leaving the only openings to be the internal manifolding second side inlet and outlet. To avoid leaking un-combusted fuel on the two edges of the interconnect not facing the external manifolds a second side purge channel 209 ensures that any fuel leaking through the sealing are purged and thus not lead out into the compartment surrounding the fuel stack. FIG. 2-G shows a side view of the interconnect in the sectional view through a cut G-G. The corresponding blow-up shown on FIG. 2-H clearly shows the mid level, the first level and the second level as already explained, with protrusions on the first side extending into the first level and protrusions on the second side extending into the second level. It can be seen that a protrusion on the first side 107 corresponds an indentation on the second side 208, however, where said indentation extends into the first level 111 and likewise a protrusion on the second side 207 corresponds an indentation on the first side 108, but said indentation extends into the second level 222.

According to the invention, this at least three-level design of an interconnect made from plastically deformed metal-sheet allows for a very simple and cheap production potentially in a single or very few production steps. In another embodiment of the invention, as shown on FIGS. 3-O and 3-A, the protruding seal surface along the two edges of the interconnect can be made by a following folding process step, which provides for relatively broad seal surfaces.

The FIG. 2-I is a perspective view of the first side of the interconnect as already explained, with blow up of the edge seal surfaces shown on FIG. 2-F to clearly visualize the flow paths, protrusions and indentations. The blow up shown on FIG. 2-J gives a clear view of the protruding seal surface on the first side of the interconnects which seals off the aperture serving as flow outlet to the second side of the interconnect. Further FIG. 2-J gives a clear view of the first side indentations which serves for leading flow in between the first side protruding contact areas.

The invention claimed is:

1. An interconnect for a fuel cell comprising a plurality of flow providing manifolds, the interconnect comprises a first and a second side, each side having flow paths, one or more flow inlets and inlet zones distributing the flow between said flow paths, one or more flow outlets and outlet zones, protrusions formed of protruding seal surfaces, protruding contact areas and protruding seal surface supports, said flow paths are formed between the protruding seal surfaces and the protruding contact areas, wherein said interconnect is made of a metal sheet comprising at least a mid level defined by the metal sheet part without protrusions, a first level defined by the protrusions on the first side and a second level defined by the protrusions on the second side such that a protrusion on the first side corresponds an indentation on the second side extending into the first level and a protrusion on the second side corresponds an indentation on the first side extending into the second level; and the flow inlet zones, the flow outlet zones, the flow paths, the protruding contact areas, the protruding seal surface supports and the protruding seal surfaces are integrated in both sides of said metal sheet.

2. An interconnect according to claim 1, wherein the position of said seal surfaces are supported by indentations.

3. An interconnect according to claim 1, wherein one or more of said seal surfaces on the first or second side comprise(s) at least one purge channel.

4. An interconnect according to claim 1, wherein said seal surfaces and said contact areas are flexible.

5. An interconnect according to claim 1, wherein said metal sheet has a thickness between 50 and 400 μm, preferably between 100 and 250 λm.

6. An interconnect according to claim 1, wherein said metal sheet consist of chrome steel or a nickel alloy.

7. An interconnect according to claim 1, wherein said flow paths on the first side and second side of said interconnect are designed to provide even flow distribution between each of the flow paths on the first side and the second side, respectively.

8. An interconnect according to claim 1, wherein the one or more flow inlets on the first or second side of said interconnect is internal and the one or more flow inlets on the second or first side, respectively, of said interconnect is external.

9. An interconnect according to claim 1, wherein said flow paths are intersected by by-pass flow paths comprising breaches in the protruding contact areas.

10. An interconnect according to claim 1, wherein said flow paths are intersected by indentations.

11. An interconnect according to claim 1, wherein the protruding contact areas on the first or second side of said interconnect comprise discrete points and the protruding contact areas on the second or first side respectively comprise oblong ridges.

12. A fuel cell repeating unit comprising an electrolyte, an anode, a cathode and an interconnect according to claim 1.

13. A fuel cell repeating unit according to claim 12, wherein the fuel cell is a high temperature fuel cell.

14. A fuel cell repeating unit according to claim 12, wherein the fuel cell is a solid oxide fuel cell or a molten carbonate fuel cell.

15. A fuel cell repeating unit according to claim 12, wherein the fuel cell is a PEM proton exchange membrane fuel cell.

16. A fuel cell repeating unit according to claim 12, wherein the fuel cell is a DMFC direct methanol fuel cell.

17. A fuel cell stack comprising at least two fuel cell repeating units according to claim 12.

* * * * *

UNITED STATES PATENT AND TRADEMARK OFFICE
CERTIFICATE OF CORRECTION

PATENT NO.       : 8,663,863 B2                                Page 1 of 1
APPLICATION NO.  : 13/056803
DATED            : March 4, 2014
INVENTOR(S)      : Niels Erikstrup It is certified that error appears in the above-identified patent and that said Letters Patent is hereby corrected as shown below:

In the Claims:

Column 14, claim 5, line 8, change "250 $\lambda$m" to --"250 $\mu$m"--.

Signed and Sealed this
Thirty-first Day of March, 2015

Michelle K. Lee
*Director of the United States Patent and Trademark Office*